(12) United States Patent
Subramaniam

(10) Patent No.: US 11,870,620 B2
(45) Date of Patent: Jan. 9, 2024

(54) SATELLITE RECEIVER INCLUDING PRE-EQUALIZER TO COMPENSATE FOR LINEAR IMPAIRMENTS

(71) Applicant: Bala Subramaniam, Potomac, MD (US)

(72) Inventor: Bala Subramaniam, Potomac, MD (US)

(73) Assignee: Hughes Networks Systems, Germantown, MD (US)

(*) Notice: Subject to any disclaimer, the term of this patent is extended or adjusted under 35 U.S.C. 154(b) by 72 days.

(21) Appl. No.: 17/646,359

(22) Filed: Dec. 29, 2021

(65) Prior Publication Data

US 2023/0208687 A1    Jun. 29, 2023

(51) Int. Cl.
*H04L 27/01* (2006.01)
*H04L 25/03* (2006.01)

(52) U.S. Cl.
CPC ........ *H04L 27/01* (2013.01); *H04L 25/03019* (2013.01); *H04L 25/03891* (2013.01)

(58) Field of Classification Search
CPC ............... H04L 27/01; H04L 25/03019; H04L 25/03891; H04L 7/0054; H04L 7/0058; H04L 7/0079; H04L 7/0083; H04L 7/0087; H04L 7/0047; H04L 7/0048; H04L 7/005
See application file for complete search history.

(56) References Cited

U.S. PATENT DOCUMENTS

| | | | | |
|---|---|---|---|---|
| 5,690,809 A | * | 11/1997 | Subramaniam | C07C 5/226 585/824 |
| 7,016,444 B2 | * | 3/2006 | Parr | H04L 7/0054 375/354 |
| 8,189,504 B2 | * | 5/2012 | Becker | H04B 7/18504 370/316 |
| 8,300,571 B2 | * | 10/2012 | Becker | H04B 7/18504 370/316 |
| 8,401,038 B2 | * | 3/2013 | Becker | H04L 7/0016 375/240 |
| 8,428,106 B2 | * | 4/2013 | Cairns | H04B 1/712 375/150 |
| 8,630,337 B2 | * | 1/2014 | Meyer | H04L 27/0014 375/348 |
| 8,730,865 B2 | * | 5/2014 | Wajcer | H04L 1/0057 370/316 |

(Continued)

FOREIGN PATENT DOCUMENTS

EP    2162994 B1  *  8/2016  ......... H04B 1/71052
JP    2016046690 A  *  4/2016

(Continued)

OTHER PUBLICATIONS

International search report for PCT Application No. PCT/US2022/081564.

(Continued)

*Primary Examiner* — James M Perez
(74) *Attorney, Agent, or Firm* — Capitol City TechLaw; Jasbir Singh

(57) ABSTRACT

A receiver and method for compensating for linear impairments at a receiver including receiving an Rx signal including an asymmetric response of a satellite filter; pre-equalizing the Rx signal with a coefficient; and demodulating, after the pre-equalizing, the Rx signal.

14 Claims, 2 Drawing Sheets

(56) References Cited

U.S. PATENT DOCUMENTS

| | | | | |
|---|---|---|---|---|
| 9,036,661 B2* | 5/2015 | Becker | ................. | H04L 7/0016 375/240 |
| 9,178,683 B2* | 11/2015 | Varma | ................. | H04L 7/0029 |
| 9,621,381 B2* | 4/2017 | Kim | ................. | H04B 7/18543 |
| 10,999,048 B1* | 5/2021 | Beidas | ................. | H04L 7/0079 |
| 11,025,365 B1* | 6/2021 | Harrington | ........... | H04L 1/0003 |
| 11,336,493 B1* | 5/2022 | Patel | ................. | H04L 27/01 |
| 2007/0153888 A1* | 7/2007 | Kim | ................. | H04N 21/2383 375/229 |
| 2007/0217551 A1* | 9/2007 | Kang | ................. | H04H 60/11 375/265 |
| 2009/0022087 A1* | 1/2009 | Dankberg | ......... | H04B 7/18582 370/316 |
| 2009/0023437 A1* | 1/2009 | Cairns | ................. | H04L 25/0242 455/422.1 |
| 2010/0150037 A1* | 6/2010 | Becker | ............... | H04B 7/18504 370/310 |
| 2010/0150053 A1* | 6/2010 | Becker | ................. | H04L 7/0016 370/316 |
| 2010/0150054 A1* | 6/2010 | Becker | ................. | H04L 7/0016 370/316 |
| 2010/0309970 A1* | 12/2010 | Meyer | ................. | H04L 27/0014 375/329 |
| 2012/0039247 A1* | 2/2012 | Wajcer | ................. | H04B 7/18513 370/316 |
| 2013/0155922 A1* | 6/2013 | Becker | ............... | H04B 7/18504 370/310 |
| 2013/0271658 A1* | 10/2013 | Mombers | ................. | H04N 5/06 348/E5.009 |
| 2013/0315346 A1* | 11/2013 | Varma | ................. | H04H 40/90 375/316 |
| 2015/0207650 A1* | 7/2015 | Spyropoulos | ..... | H04L 25/03184 375/340 |
| 2015/0333936 A1* | 11/2015 | Kim | ................. | H04B 7/18543 375/232 |
| 2020/0274611 A1* | 8/2020 | Mendelsohn | ............ | H01Q 3/18 |
| 2021/0203413 A1* | 7/2021 | Hamet | ................. | H04B 7/1855 |
| 2021/0211188 A1* | 7/2021 | Hamet | ................. | H04W 72/542 |
| 2022/0376959 A1* | 11/2022 | Subramaniam | ... | H04L 25/03343 |
| 2022/0385366 A1* | 12/2022 | Seki | ................. | H04B 10/25752 |
| 2023/0208687 A1* | 6/2023 | Subramaniam | ... | H04L 25/03019 375/231 |

FOREIGN PATENT DOCUMENTS

| | | | |
|---|---|---|---|
| JP | 2016059026 A | * | 4/2016 |
| JP | 2016059027 A | * | 4/2016 |
| WO | 2019139592 A1 | | 7/2019 |
| WO | 2022245603 A1 | | 11/2022 |
| WO | WO-2022245603 A1 | * | 11/2022 ....... H04L 25/03159 |

OTHER PUBLICATIONS

Kojima Masaaki et al: "Study on equalization system using transponder characteristics to compensate for non-linear distortion", 2016 IEEE Radio and Wireless Symposium (RWS), IEEE, Jan. 24, 2016 (Jan. 24, 2016), pp. 13-15, XP032888108, DOI: 10.1109/RWS. 2016.7444350, [retrieved on Mar. 30, 2016] the whole document.

* cited by examiner

SATELLITE RECEIVER INCLUDING PRE-EQUALIZER TO COMPENSATE FOR LINEAR IMPAIRMENTS

FIELD

A system and method for reducing linear impairments, such as group delay and amplitude distortion, caused by filters in a gateway, satellite, and satellite terminal. A higher symbol rate throughput through the satellite filter is made by compensating for an asymmetric group delay in the terminal using a pre-equalizer to improve link capacity, for example, a forward link capacity. Pre-equalizer coefficients may be updated without interruption of service using a downlink stream, for example, a DVB-S2 (Digital Video Broadcasting-Satellite-Second Generation) stream.

BACKGROUND

Typically a terminal receiver includes a BTR (Bit Tracking Recovery) module that uses a 2nd order loop to track symbol timing offsets. 2nd order loops are preferable as they are well understood and do not have any stability issues when compared to higher order loops. The loop bandwidth is typically set to 2% of the symbol rate to have reasonable dynamic tracking ability and at the same time keep the noise lower.

An asymmetric response of satellite filters causes a large timing jitter in the BTR loop. The increased timing jitter results in BTR loosing lock and an inability to proceed with the demodulation. Once a BTR loses lock, the demodulator has to repeat the acquisition process and remains in the endless loop. One way for BTR loop to maintain lock is to reduce the symbol rate such that the signal lies within the symmetric portion of the satellite filter. But this results in loss of capacity on the forward link. In a typical demodulator flow the equalizer is present after the BTR loop. As such, the BTR loop is seeing the asymmetric group delay before it is equalized. Higher order modulations such as 64 APSK, 256 APSK further degrade BTR performance due to the asymmetric group delay.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings improve the forward link capacity on high throughput satellites by compensating for satellite filter distortions. A higher symbol rate throughput through a satellite filter is achieved by compensating for an asymmetric group delay in the terminal using a pre-equalizer. The pre-equalizer coefficients may be updated using a downlink stream without interruption of service.

A system of one or more computers can be configured to perform particular operations or actions by virtue of having software, firmware, hardware, or a combination of them installed on the system that in operation causes or cause the system to perform the actions. One general aspect includes receiving an Rx signal including an asymmetric response of a satellite filter; pre-equalizing the Rx signal with a coefficient; and demodulating, after the pre-equalizing, the Rx signal. Other embodiments of this aspect include corresponding computer systems, apparatus, and computer programs recorded on one or more computer storage devices, each configured to perform the actions of the methods.

Implementations may include one or more of the following features. The method may include associating the coefficient with a beam providing the Rx signal. The method may include receiving the coefficient from a gateway. The Rx signal may include a DVB-S2 (digital video broadcasting-satellite-second generation) continuous or bursty signal. The method may include detecting a pre-equalizer PLS (physical layer scrambling) code in a PL header embedded in the Rx signal; capturing a received training sequence after the detecting; computing the coefficient to converge the received training sequence with a known sequence; and updating the coefficient of the pre-equalizing to the computed coefficient. The Rx signal may include frames, one of the frames may include the pre-equalizer PLS code and the received training sequence. A subsequent frame to the one of the frames may include the pre-equalizer PLS code and the received training sequence. The method may include identifying a unique word indicating a frame start in the one of the frames; and triggering the capturing after the identifying and the detecting succeed in the one of the frames. Implementations of the described techniques may include hardware, a method or process, or computer software on a computer-accessible medium.

One general aspect includes a receiver to compensate for linear impairments. The receiver a pre-equalizer to pre-equalize the Rx signal with a coefficient, and a demodulator to demodulate the Rx signal after the pre-equalizer. Other embodiments of this aspect include corresponding computer systems, apparatus, and computer programs recorded on one or more computer storage devices, each configured to perform the actions of the methods.

Implementations may include one or more of the following features. The receiver where the coefficient is associated with a beam providing the Rx signal. The receiver where the coefficient is received from a gateway. The Rx signal may include a DVB-S2 (digital video broadcasting-satellite-second generation) continuous signal. The receiver may include a UWP (unique word processor) to detect a pre-equalizer PLS (physical layer scrambling) code in a PL header embedded in the Rx signal; a memory to capture a received training sequence after the detection; and a software processor to compute the coefficient to converge the received training sequence with a known sequence and to update the coefficient of the pre-equalizer to the computed coefficient. The Rx signal may include frames, one of the frames may include the pre-equalizer PLS code and the received training sequence. A subsequent frame to the one of the frames may include the pre-equalizer PLS code and the received training sequence. The UWP identifies a unique word indicating a frame start in the one of the frames and triggers a memory capture. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates linear impairments present on a forward link in a satellite system according to various embodiments.

Figure 1:
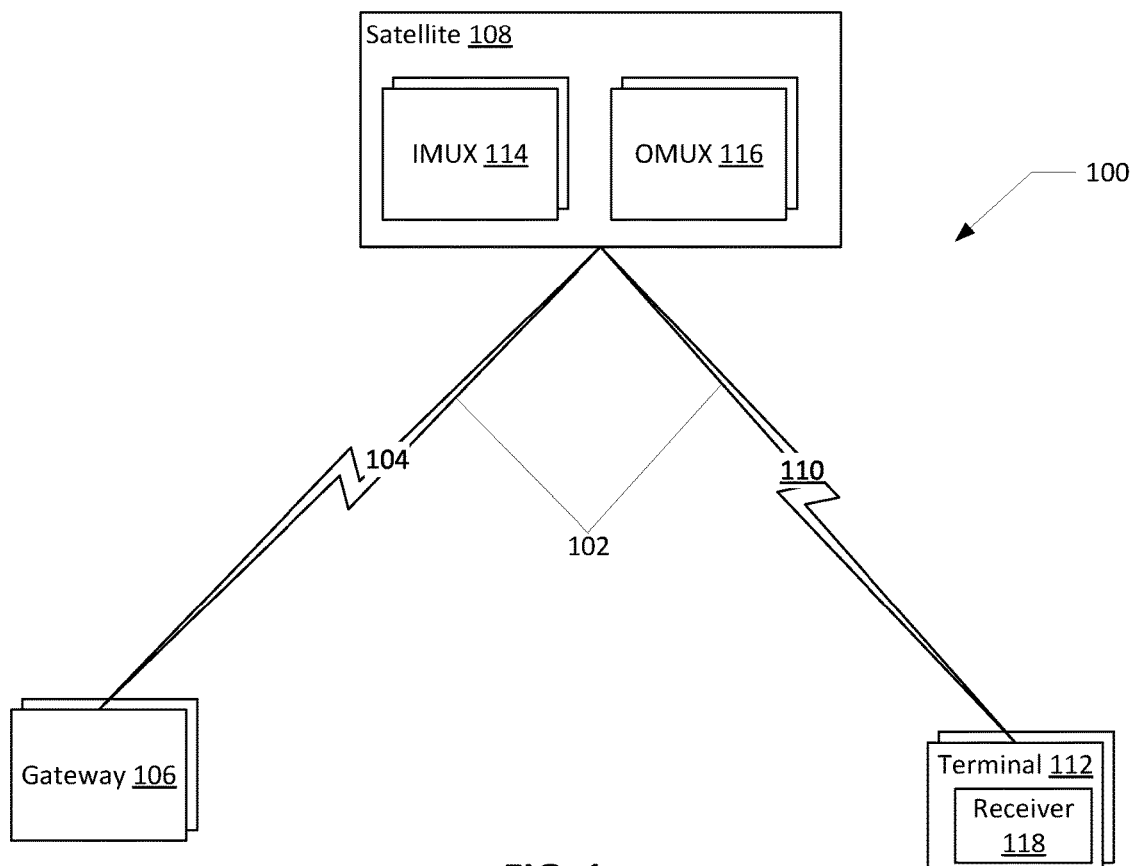

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Linear impairments, such as group delay and amplitude distortion, are caused by filters in the gateway, satellite, and terminals. The present teachings may improve a forward link symbol rate by as much as 5% for higher order modulations, for example, >4 bps/Hz, and in an Adaptive Coding Modulation (ACM) stream.

FIG. 1 illustrates linear impairments present on a forward link in a satellite system according to various embodiments.

A satellite system 100 may provide a forward channel 102 to communicate from a gateway 106 to a terminal 112. The forward channel 102 may include an uplink 104 from the gateway 106 to a satellite 108. The forward channel 102 may include a downlink 110 from the satellite 108 to the terminal 112. The satellite 108 may be an HTS (High Throughput Satellite), typically, a satellite having 300 Gbps or greater capacity.

In the forward channel 102, the frequency response is dominated by filters, such as an IMUX (Input Multiplexor) filter 114 and an OMUX (Output Multiplexor) filter 116, on board the satellite 108. In high throughput satellites, the IMUX filter 114 and the OMUX filter 116 in the satellite 108 are implemented using solid state technology to reduce weight. The satellite filter group (IMUX filter 114 and OMUX filter 116) delay response is asymmetric with large in-band slope. The group delay distortion places a limit on symbol throughput to the symmetric region of the filter. The gateway 104 may include filters. The terminal 112 may include various filters, such as, an ODU (Outdoor Unit) filter, an IFL (inter-facility link) tuner filter and the like. The terminal 112 may include a receiver 118 of the present teachings. The receiver 117 may be disposed in the ODU.

Use of multiple beams requires several filter configurations. In some embodiments, there may be a one-to-one correspondence between a gateway, a beam and a pair of IMUX and OMUX filters. The IMUX and OMUX filters (114 and 116) are constructed using solid state technology to reduce the payload weight in the satellite.

In the present teachings, a pre-equalizer before a bit tracking and recovery module compensates for an asymmetric response of a satellite filter. The output of the pre-equalizer provides a symmetric response to enable a BTR (Bit Tracking Recovery) loop to stay in lock. After pre-equalization, a supported symbol rate may span the entire asymmetric region of the satellite filter, thus improving the capacity of the forward link.

Figure 2:
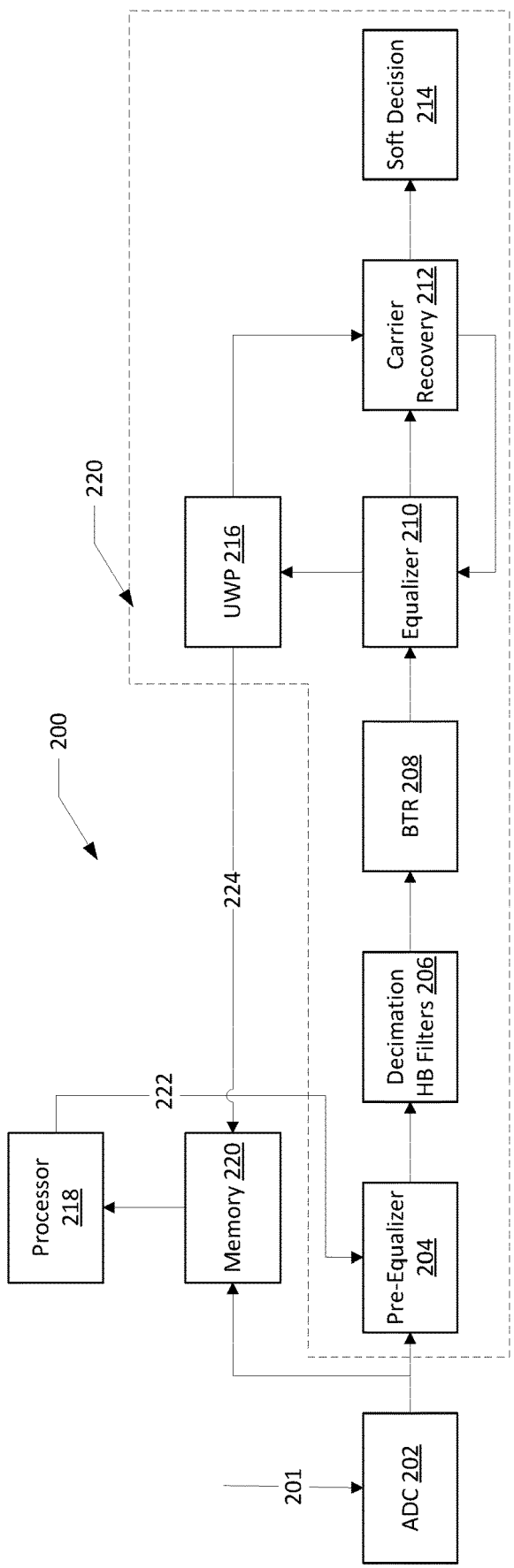
FIG. 2 illustrates a satellite receiver including a pre-equalizer to compensate for linear impairments according to various embodiments.

FIG. 2 illustrates a satellite receiver including a pre-equalizer to compensate for linear impairments according to various embodiments.

FIG. 2 illustrates a satellite receiver 200 including a pre-equalizer 204. The receiver 200 may be a continuous or bursty mode receiver, for example, a DVB-S2/S2X continuous mode receiver. An ADC 202 (Analog to Digital Converter) converts an Rx signal 201 that is analog to digital samples. The digital samples are sent to a pre-equalizer 204 and a memory 220. The output of the pre-equalizer 204 is sent to a demodulator 230. The demodulator 230 includes filtering, BTR, equalizing, unique word processing and carrier recovery to arrive at soft decisions.

The output of the pre-equalizer 204 is filtered with a series of decimation of HB (half-band) filters 206 to down sample the samples. The down sampling provides a sample rate present to BTR 208 between 2 to 4 samples/symbol. The BTR 208 tracks the symbol rate drift and presents a constant sample rate of 2 samples/symbol to an equalizer 210. The equalizer 210 is a fractional equalizer operating at 2 samples/symbol such that the symbol is insensitive to bit timing offsets. The output of the Equalizer 210 is sent to Carrier recovery module 212 to track a residual frequency and phase distortion. The Carrier recovery module 212 may compute the error information to update equalizer coefficients. The soft decision module 214 estimates the soft decision values to be sent to a FEC subsystem.

Equalizer 210 that follows the BTR 208 is continuously updating on every received symbol. As such, the equalizer 210 is more dynamic and adapts to changing signal conditions such as during mobility (aircraft, maritime or the like). The pre-equalizer 204 compensates for satellite filter distortion which does not change much over time.

In the present teachings, the output samples from the ADC 202 are routed simultaneously to both the demodulator 230 and a memory 220 for capture. Initially, the Pre-Equalizer 204 may be loaded with coefficients that compensate for typical response of the satellite filter. The coefficients may be stored in or received by the receiver 200.

Satellite filter characteristics for a given set of filters may be known apriori and used as a starting point. The known filter characteristics can be used to estimate pre-equalizer coefficients for each of the beams present in the system. The terminal can be provided the estimated pre-equalizer coefficients via a system block, at provisioning, during initialization and the like. A location of the terminal can be used to identify the beam serving the location. The coefficients corresponding to or associated with the beam may be used as a starting point by the pre-equalizer.

In some embodiments, a satellite filter response may change due to different transponder paths selected depending on a beam selected for the terminal. As such, the pre-equalizer coefficients may be associated with a beam identifier and updated upon a beam change. The satellite filter characteristics may change due to temperature and aging. As such, the pre-equalizer coefficients may be adapted over time During gateway switchover, the terminal may not be aware of the new filter path a forward signal is using. The pre-equalizer coefficients may be updated for the new filter path characteristics over time or during the switchover. In some embodiments, characteristics of the new filter path may be close enough to work with the old filter path coefficients, without specifically updating the coefficients in response to the switchover.

The output of the equalizer 210 is provided to a UWP (Unique Word processor) 212 to detect a Unique word in the Rx signal 201. After a unique word is detected, the UWP 212 decodes the PLS header to find the modulation and FEC rate of the current frame and to maintain frame synchronization. When the PLS header detected after the unique word includes a pre-equalizer PLS code, a trigger 224 is sent to the memory 220 to start capturing the incoming ADC samples from the ADC 202. The capture trigger 224 arms the Memory 220. The ADC samples may be captured until the memory 220 is filled up. In some embodiments, the size of the memory 220 may be large enough to capture two of the Pre-Equalizer 204 frames. Once the memory 220 has been filled up, an interrupt may be generated to the software processor 218. The software processor 218 may be present in a SOC (System-on-Chip) format.

The software processor 218 computes a new set of coefficients for the Pre-Equalizer based on the received ADC samples. The software processor 218 may detect the present of Pre-Equalizer frame by correlating with the SOF sequence. The software processor 218 may estimate the received training sequence symbols using the ADC samples. The software processor 218 may compute an error function between the known and received training sequence. The software processor 218 may compute a new set of Equalizer coefficients using well known algorithms such as LMS. The software processor 218 may update the Pre-Equalizer 204 with the new coefficients. The received training sequence stored in the memory 220 should correspond to the ADC samples from the Rx signal corresponding to the training frame.

Figure 3:
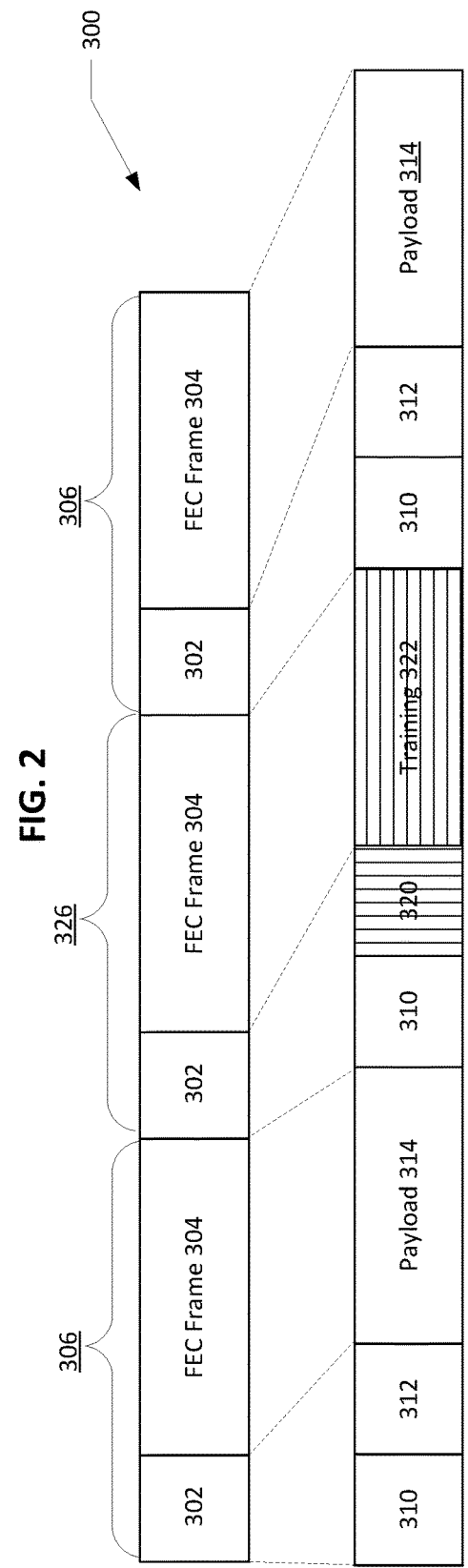
FIG. 3 illustrates a downlink frame including a pre-equalizer frame according to various embodiments.

FIG. 3 illustrates a downlink frame including a pre-equalizer frame according to various embodiments.

The Pre-Equalizer coefficients may be updated in the following method. In a continuous downlink stream 300, frames 300 are present back-to-back as shown in FIG. 3. The downlink stream 300 may be a DVB-S2/S2X stream. Each downlink frame 306, 326 includes a PL (Physical Layer) Header 302 followed by FEC Frame 304 (Payload). The PL Header 302 consists of a SOF 310 (Start of Frame) and a PLSC 312, 320 (Physical Layer Signaling Code) field. The PLSC The SOF 310 is used to detect the presence of the frame, and the PLSC 312, 320 defines the modulation and FEC rate of the frame. The UWP processor decodes the PLSC 312, 320 and provides the demodulator 230 the modulation and FEC rate embedded therein.

In some embodiments, an unused PLS (Physical Layer Scrambling) code 320 of the downlink frame is allocated may be designated for use as a Pre-Equalizer coefficient update (Pre-Equalizer PLS) to define a pre-equalizer PLS frame 326. The Pre-Equalizer PLS frame 326 carries a payload 322 with a known symbol sequence (training sequence). In a stream of downlink frames, Pre-Equalizer PLS frames 326 may be periodically inserted for updating the coefficients of the Pre-Equalizer. The frames with Pre-Equalizer PLS codes may be sent few times a day, preferably during the off-peak traffic period so as not to impact capacity. In some embodiments, more than one PLS-Equalizer coefficient update may be sent back-to-back to capture the training sequence.

Figure 4:
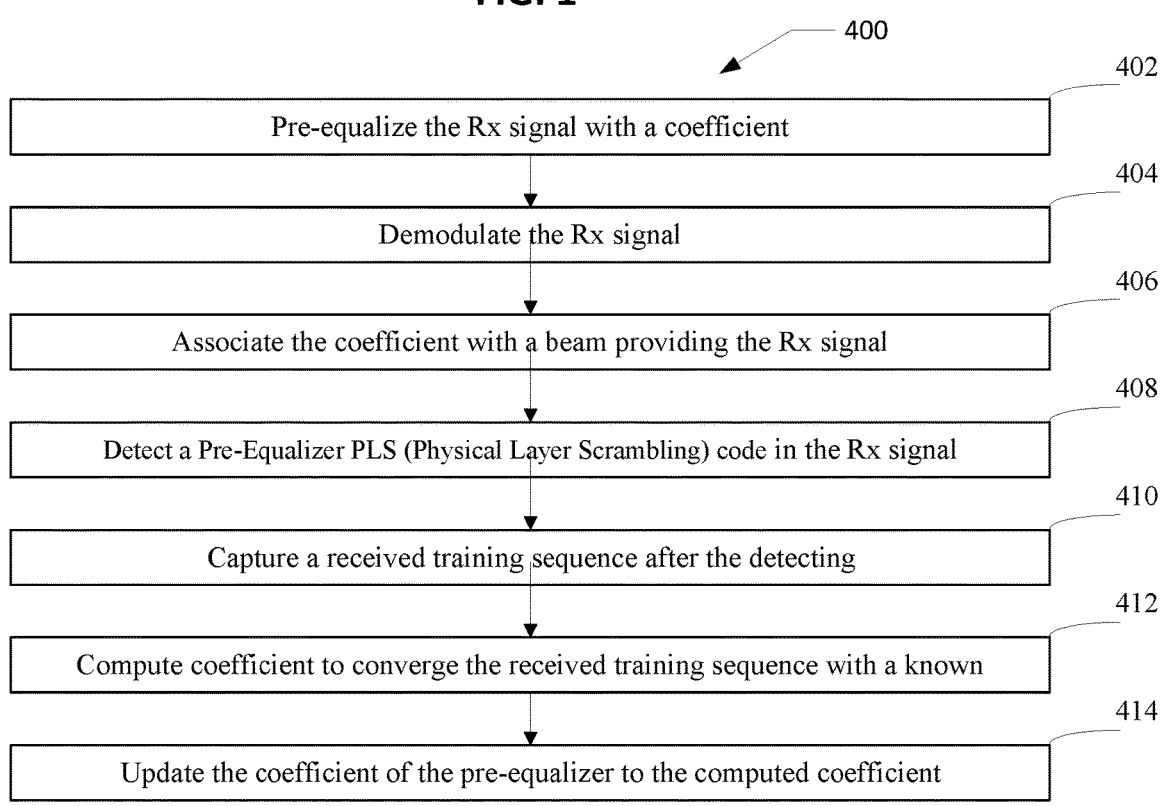
FIG. 4 illustrates a method for compensating for linear impairments at a receiver according to various embodiments.

FIG. 4 illustrates a method for compensating for linear impairments at a receiver according to various embodiments.

A method 400 for compensating for linear impairments at a receiver may include operation 402 to Pre-equalize the Rx signal with a coefficient. The method 400 may include operation 404 to Demodulate the Rx signal. The method 400 may include operation 406 to Associate the coefficient with a beam providing the Rx signal. The method 400 may include operation 408 to Detect a Pre-Equalizer PLS (Physical Layer Scrambling) code in the Rx signal. The method 400 may include operation 410 to Capture a received training sequence after the detecting. The method 400 may include operation 412 to Compute coefficient to converge the received training sequence with a known. The method 400 may include operation 414 to Update the coefficient of the pre-equalizer to the computed coefficient.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

I claim:

1. A non-transitory computer-readable storage medium having instructions embodied thereon, the instructions being executable by one or more processors to perform a method for compensating for linear impairments at a receiver, the method comprising:

receiving an Rx signal comprising an asymmetric response of a satellite filter;

pre-equalizing the Rx signal with a coefficient;

demodulating, after the pre-equalizing, the Rx signal;

detecting a Pre-Equalizer PLS (Physical Layer Scrambling) code in a PL header embedded in the Rx signal;

capturing a received training sequence after the detecting;

computing the coefficient to converge the received training sequence with a known sequence; and updating the coefficient of the pre-equalizing to the computed coefficient.

2. The method of claim 1, further comprising associating the coefficient with a beam providing the Rx signal.

3. The method of claim 1, further comprising receiving the coefficient from a gateway.

4. The method of claim 1, wherein the Rx signal comprises a DVB-S2 (Digital Video Broadcasting-Satellite-Second Generation) continuous or bursty signal.

5. The method of claim 1, wherein the Rx signal comprises frames, one of the frames comprises the pre-equalizer PLS code and the received training sequence.

6. The method of claim 5, wherein a subsequent frame to the one of the frames comprises the pre-equalizer PLS code and the received training sequence.

7. The method of claim 5, further comprising identifying a unique word indicating a frame start in the one of the frames; and triggering the capturing after the identifying and the detecting succeed in the one of the frames.

8. A receiver to compensate for linear impairments, the receiver comprising:

an Rx signal comprising an asymmetric response of a satellite filter;

a pre-equalizer to pre-equalize the Rx signal with a coefficient; and a demodulator to demodulate the Rx signal after the pre-equalizer;

a UWP (Unique Word Processor) to detect a Pre-Equalizer PLS (Physical Layer Scrambling) code in a PL header embedded in the Rx signal;
a memory to capture a received training sequence after the detection; and
a software processor to compute the coefficient to converge the received training sequence with a known sequence and to update the coefficient of the pre-equalizer to the computed coefficient.

9. The receiver of claim 8, wherein the coefficient is associated with a beam providing the Rx signal.

10. The receiver of claim 8, wherein the coefficient is received from a gateway.

11. The receiver of claim 8, wherein the Rx signal comprises a DVB-S2 (Digital Video Broadcasting-Satellite-Second Generation) continuous or bursty signal.

12. The receiver of claim 8, wherein the Rx signal comprises frames, one of the frames comprises the pre-equalizer PLS code and the received training sequence.

13. The receiver of claim 12, wherein a subsequent frame to the one of the frames comprises the pre-equalizer PLS code and the received training sequence.

14. The receiver of claim 12, wherein the UWP identifies a unique word indicating a frame start in the one of the frames and triggers a memory capture.

\* \* \* \* \*